United States Patent [19]

Hiller et al.

[11] 4,258,019
[45] Mar. 24, 1981

[54] PROCESS OF REGENERATING ALKALI CARBONATE SOLUTIONS FORMED BY THE DESULFURIZATION OF HOT GASES

[75] Inventors: Heinz Hiller, Rembrucken; Johann Schlauer; Alexander Doerges, both of Frankfurt am Main; Georg Kempf, Schoneck; Vaclav Svoboda, Darmstadt; Winfried Zeschmar, Frankfurt am Main, all of Fed. Rep. of Germany

[73] Assignee: Metallgesellschaft Aktiengesellschaft, Frankfurt am Main, Fed. Rep. of Germany

[21] Appl. No.: 922,396

[22] Filed: Jul. 6, 1978

[30] Foreign Application Priority Data

Sep. 29, 1977 [DE] Fed. Rep. of Germany ....... 2743753

[51] Int. Cl.$^3$ ............................................. B01D 53/34
[52] U.S. Cl. .................................... 423/223; 423/232; 423/233
[58] Field of Search ............... 423/210, 220, 223, 232, 423/233, 234

[56] References Cited

U.S. PATENT DOCUMENTS

| | | | |
|---|---|---|---|
| 1,918,153 | 7/1933 | Wagner | 423/233 |
| 2,094,070 | 9/1937 | Hultman et al. | 423/232 R |
| 3,934,012 | 1/1976 | Schievelbein | 423/232 |

FOREIGN PATENT DOCUMENTS

| | | | |
|---|---|---|---|
| 436218 | 10/1935 | United Kingdom | 423/232 |
| 488951 | 7/1938 | United Kingdom | 423/232 |

Primary Examiner—Earl C. Thomas
Attorney, Agent, or Firm—Sprung, Felfe, Horn, Lynch & Kramer

[57] ABSTRACT

A process for the selective removal of hydrogen sulfide from a gas containing hydrogen sulfide and carbon dioxide wherein said gas is contacted at superatmospheric pressure with an alkali metal carbonate solution, the resultant solution which contains hydrosulfide and bicarbonate is subjected to pressure reduction, the total alkali metal bicarbonate content of the resultant solution is adjusted so that it is at least 55% of the total alkali content of the solution and the said solution is then stripped and recycled to the hydrogen sulfide absorption step.

12 Claims, 3 Drawing Figures

PROCESS OF REGENERATING ALKALI CARBONATE SOLUTIONS FORMED BY THE DESULFURIZATION OF HOT GASES

This invention relates to a process of regenerating alkali carbonate solutions which contain hydrosulfides and bicarbonates and have been formed by the desulfurization of $CO_2$-containing hot gases by absorption under superatmospheric pressure and comprises pressure-relieving and stripping the solutions.

It is known that gases formed, e.g., by the reaction of liquid or solid carbonaceous fuels with gases which contain free oxygen and with water vapor can be desulfurized by being scrubbed under superatmospheric pressure with a concentrated aqueous solution of one or more alkali salts of weak inorganic acids at a temperature which is near the atmospheric boiling point of the solution and the laden solution can be regenerated by being pressure-relieved, heated, and stripped with water vapor (Printed German Application No. 2,127,768).

In the known process steam is consumed at a high rate to regenerate the solution if only a small sulfur content is permissible in the regenerated solution in order to enable a substantial desulfurization of the gas. The gas cannot be desulfurized satisfactorily if steam is available only at a restricted rate for the regeneration. Besides, the $H_2S$ content of the exhaust gas formed by the regeneration will necessarily depend on the rate at which $CO_2$ is scrubbed off too as the gas is desulfurized. Particularly when the gas to be desulfurized has a low $H_2S$ content, the processing of the resulting exhaust gas to form elementary sulfur with a high conversion, e.g., in Claus process plants, will involve a high expenditure if a substantial emission of polluting sulfur compounds is to be avoided.

It is an object of the invention to avoid these and other disadvantages of the prior art, to reduce the rate at which steam is consumed in regenerating the laden absorbent to improve the desulfurization of the gas, and to enable the recovery of an exhaust gas having a higher $H_2S$ concentration.

This object is accomplished according to the invention in that the alkali bicarbonate content of the pressure-relieved solution which is to be stripped is adjusted to at least 55% of the total alkali content of the solution, the solution is then stripped at its boiling temperature to remove a predominant part of its $H_2S$ content and part of its $CO_2$ content, and the stripped solution is re-used to desulfurize gas without being cooled before.

According to a preferred further feature of the invention, a decrease of the alkali bicarbonate content of the laden solution before the stripping is avoided in that the solution before being pressure-relieved is cooled below its boiling temperature at the pressure relief and pressure, preferably to 80°-95° C.

According to a further preferred feature of the invention the cooled solution is treated under normal or superatmospheric pressure at 50° to 100° C. with a gas which consists predominantly of $CO_2$ and the $CO_2$-saturated solution is then stripped at its boiling temperature with a gas which consists predominantly of water vapor.

In another embodiment of the invention, the stripped solution is cooled once more and is stripped at 50° to 100° C. with a gas which consists predominantly of $CO_2$ and is subsequently stripped with a gas which consists predominantly of water vapor. Within the scope of the invention that multi-stage treatment can be repeated several times.

The stripping gas consisting predominantly of water vapor is desirably obtained by an indirect heating of the stripped solution so that the solution is stripped with its own vapor, suitably in a countercurrent.

Within the scope of the invention, a suitable high-$CO_2$ gas for saturating the cooled solution can be obtained in that the exhaust gas, which is formed by the stripping step and consists mainly of water vapor and $CO_2$ and contains also $H_2S$ is cooled, the aqueous condensate is separated and the cooled gas is scrubbed with a partial stream of the alkali carbonate solution at a temperature below 60° C., preferably 25° to 35° C.

In this way most of the hydrogen sulfide contained in the cooled gas is selectively scrubbed off so that all or part of the scrubbed low-$H_2S$ gas which consists predominantly of $CO_2$ can be used to saturate the cooled solution that is to be regenerated.

Within the scope of the invention, the saturating step, in which part of the $CO_2$ is transferred from the gas into the solution, may be succeeded by the use of the non-absorbed gas for stripping the partial stream of the alkali carbonate solution which has been used to scrub the cooled exhaust gas formed by the stripping step and the non-absorbed gas may then be discharged whereas the stripped partial stream is returned to the main cycle of the alkali carbonate solution.

As a result, virtually all hydrogen sulfide which has been stripped from the solution to be regenerated is contained in the exhaust gas which is discharged. The concentration of hydrogen sulfide in that exhaust gas will be increased if only part of the scrubbed gas, which consists predominantly of $CO_2$, is used first to saturate the cooled solution to be regenerated, and subsequently to strip the high-$H_2S$ partial stream of the solution, and the remaining portion is discharged as a low-$H_2S$ exhaust gas.

In accordance with the invention the high-$H_2S$ partial stream of the alkali carbonate solution which has been used to scrub the cooled exhaust gas formed by the stripping step can be regenerated by stripping said partial stream at its boiling temperature with a gas consisting predominantly of water vapor so as to remove substantially all hydrogen sulfide, whereafter the resulting gas, which contains hydrogen sulfide, is discharged and the stripped partial stream is returned to the main cycle of the alkali carbonate solution.

According to a preferred feature of the invention the gas consisting predominantly of $CO_2$ and used to saturate the cooled solution is formed by the regeneration of a second cycle of alkali carbonate solution used to scrub the desulfurized, $CO_2$-containing hot gas under superatmospheric pressure. In this embodiment, the first desulfurizing cycle is succeeded in the gas flow path by a second cycle of alkali carbonate solution, which supplies the $CO_2$ required to regenerate the laden solution in the first cycle. Besides, the second scrubbing of the gas under superatmospheric pressure with absorbent flowing in a second cycle causes additional hydrogen sulfide to be removed from the gas so that its desulfurization can also be improved. The alkali carbonate solutions in the two cycles may differ in composition. For instance, a concentrated solution may be used in the first cycle and a more dilute solution in the second or vice versa.

Within the scope of the invention it is preferable to use an alkali carbonate solution to which sodium tetraborate has been added, preferably in an amount of 1 to 20 mole percent of the total alkali content of the solution, i.e., 1 to 20% of the total alkali which can be titrated with acid should be added as sodium tetraborate, $Na_2B_4O_7$.

The advantages afforded by the invention reside in that an alkali carbonate solution which contains hydrosulfide and bicarbonate and has been obtained by the desulfurization of $CO_2$-containing hot gases under superatmospheric pressure can be selectively regenerated by the process described in that almost all of the combined hydrogen sulfide contained in the solution as hydrosulfide but only part of the combined carbon dioxide present as bicarbonate are released and stripped off. This will be particularly significant if a selective removal of hydrogen sulfide from such gas is desired, i.e., when it is desired to scrub as much hydrogen sulfide as possible and as little $CO_2$ as possible from the gas, as is required in various applications, e.g., in the desulfurization of fuel gas for a gas turbine process in which the mass of the humid gas should be preserved as far as possible before it is burnt. Besides, the process renders the driven-off hydrogen sulfide available in a higher concentration. Moreover, the further processing is facilitated and the investment and supplies required for the further processing are reduced. Finally, the quantity of polluting gases emitted into the environment may be decreased.

The reactions taking place in the alkali carbonate solution are known and may be summarized as follows:

Absorption:

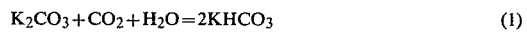

$$K_2CO_3 + CO_2 + H_2O = 2KHCO_3 \qquad (1)$$

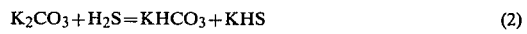

$$K_2CO_3 + H_2S = KHCO_3 + KHS \qquad (2)$$

The reactions take place in the opposite direction during the regeneration:

$$2KHCO_3 = K_2CO_3 + H_2O \qquad (3)$$

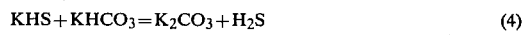

$$KHS + KHCO_3 = K_2CO_3 + H_2S \qquad (4)$$

From equation (4) it is apparent that bicarbonate is required for the decomposition of the hydrosulfide which has been absorbed. Such alkali carbonate solutions formed by the desulfurization of $CO_2$-containing gases contain in more cases more bicarbonate than hydrosulfide. But when the solutions are regenerated in the conventional manner by being pressure-relieved, heated and stripped with steam, equal percentages of bicarbonate and hydrosulfide are always decomposed and driven off as $CO_2$ and $H_2S$. In that case, when 90% of the hydrosulfide are to be removed by the regeneration, about 90% of the bicarbonate must also be decomposed and driven off. The regenerated solution will then contain only 10% of the hydrosulfide content but will also contain only 10% of the bicarbonate content of the unregenerated solution. Such regenerated solution contains almost only alkali carbonate and for this reason can form much bicarbonate when it is used to desulfurize the $CO_2$-containing gas under superatmospheric pressure. As a result, $CO_2$ is scrubbed off at a high rate so that the desulfurization of the gas is less selective, with all disadvantages listed herein before.

Whereas much bicarbonate is required for a substantial regeneration of alkali carbonate solutions which contain hydrosulfide, part of the $CO_2$ required for this purpose may be recirculated and re-used in the regenerating stage in the process according to the invention if this is required. For this reason the regenerated solution may have a relatively high bicarbonate content and yet be freed almost completely from hydrosulfide, i.e., subjected to a selective desulfurization.

A preferred feature of the invention is based on the recognition that the purified gas which has been obtained by the desulfurization can be used to special advantage in a combined power plant process. For that purpose the hot desulfurized hot gas which is under superatmospheric pressure is used for an ecologically satisfactory production of electric power in a combined power plant process, in which energy is recovered from the gas by a pressure relief and/or combustion and is utilized to drive gas turbines and/or to produce steam.

That practice affords the advantage that the $CO_2$ left in the desulfurized gas greatly increases the efficiency of the combined power plant process because the energy contained in the $CO_2$ under superatmospheric pressure can be utilized.

Another advantage of the invention resides in that the $H_2S$-containing exhaust gas formed by the regeneration of the absorbent has a higher $H_2S$ content than the exhaust gas formed in a regenerating process known in the art. As a result, the plants for processing such exhaust gas may be smaller and less expensive and can operate more economically.

The invention will be described more fully hereinafter. The invention is shown diagrammatically and by way of example in FIG. 1 to 3. The drawings show only the most important elements of the process, whereas pumps and valves, e.g., have been omitted for the sake of clearness.

EXAMPLE 1

Figure 1:
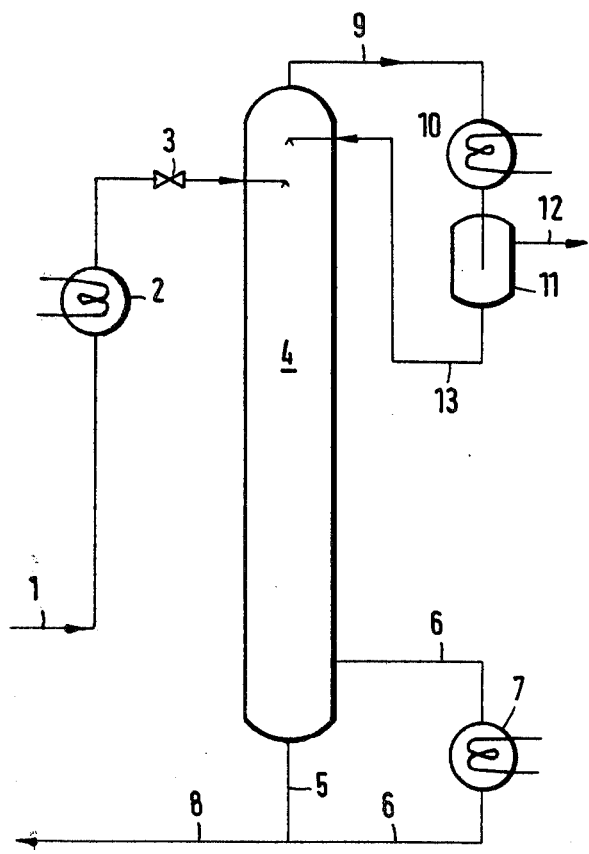
FIG. 1 is a flow diagram illustrating one embodiment of the invention.

The process according to the invention is shown in its simplest form in FIG. 1. That embodiment may be used if the alkali carbonate solution which has been formed by the desulfurization of the gas and is to be regenerated contains at least 55% of its alkali as bicarbonate. This solution is fed through conduit 1 at a temperature of 115° C. under a pressure of 20 bars and consists of an aqueous solution of 251 grams $KHCO_3$/liter, 5.0 grams $KHS$/liter 62.5 grams $K_2CO_3$/liter and 60 grams $Na_2B_4O_7.10 H_2O$/liter. The $KHCO_3$ content thus amounts to 66% of the total content of which rises in the regenerator 4. Gases and vapors from the top of regenerator 4 flow through conduit 9, are cooled and partially condensed in the indirect cooler 10. Gases and condensate are separated in the separator 11. Remaining gases are removed through the conduit 12. The condensate flows back to the top of the regenerator 4 through conduit 13. The solution is cooled to 90° C. in the cooler 2 and is pressure-relieved in the pressure-relief valve 3 and then enters the regenerating column 4, which is under a pressure of 1.5 bars. Almost no gas and water vapor are released by the pressure relief, which does not change the bicarbonate and hydrosulfide contents.

In the regenerator 4, the solution is heated and decomposed by the gases which rise from the lower portion and consist predominantly of water vapor. As a result, the solution releases $CO_2$ and $H_2S$. In the lower portion, the solution is circulated in conduits 5 and 6 and the indirectly heated heater 7, whereby mainly water vapor is produced, which rises in the regenerator 4. The regenerator solution runs off through conduit 8 and now contains only 72.3 grams $KHCO_3$/liter and 1.1 grams KHS/liter. The borax content has not been changed and the $K_2CO_2$ content has increased to 189.9 grams per liter. The bicarbonate content has thus been decreased to 28.8% of its initial value and the hydrosulfide content to 22.0% of its initial value. It is apparent that the hydrosulfide content has been decreased more than the bicarbonate content, which means that the regeneration is selective with respect to hydrosulfide or $H_2S$. The solution may now be re-used for a selective desulfurization of gas.

CONTROL EXAMPLE

When the cooler 2 is not operated, in accordance with the state of the art, the incoming solution at 115° C. is pressure-relieved in the valve 3 to a $KHCO_3$ content of 49% of the total alkali content, and the heater 7 is supplied with steam at the same rate as in the preceding Example, the resulting regenerated solution contains 77.8 grams $KHCO_3$/liter, 1.5 grams KHS/liter, 60 grams borax/liter and 185.7 grams $K_2CO_3$/liter. In this operation, which is in accordance with the prior art, the $KHCO_3$ content has been decreased by 69% and the KHS content by 70%, which means that the portions driven off are about the same. The regeneration is not selective. When the regenerated solution is used to desulfurize gas, this unselective regeneration results in a higher residual $H_2S$ content of the scrubbed gas, in the removal of more $CO_2$ by scrubbing, and in a lower concentration of $H_2S$ in the $H_2S$-containing exhaust gas.

EXAMPLE 2

Figure 2:
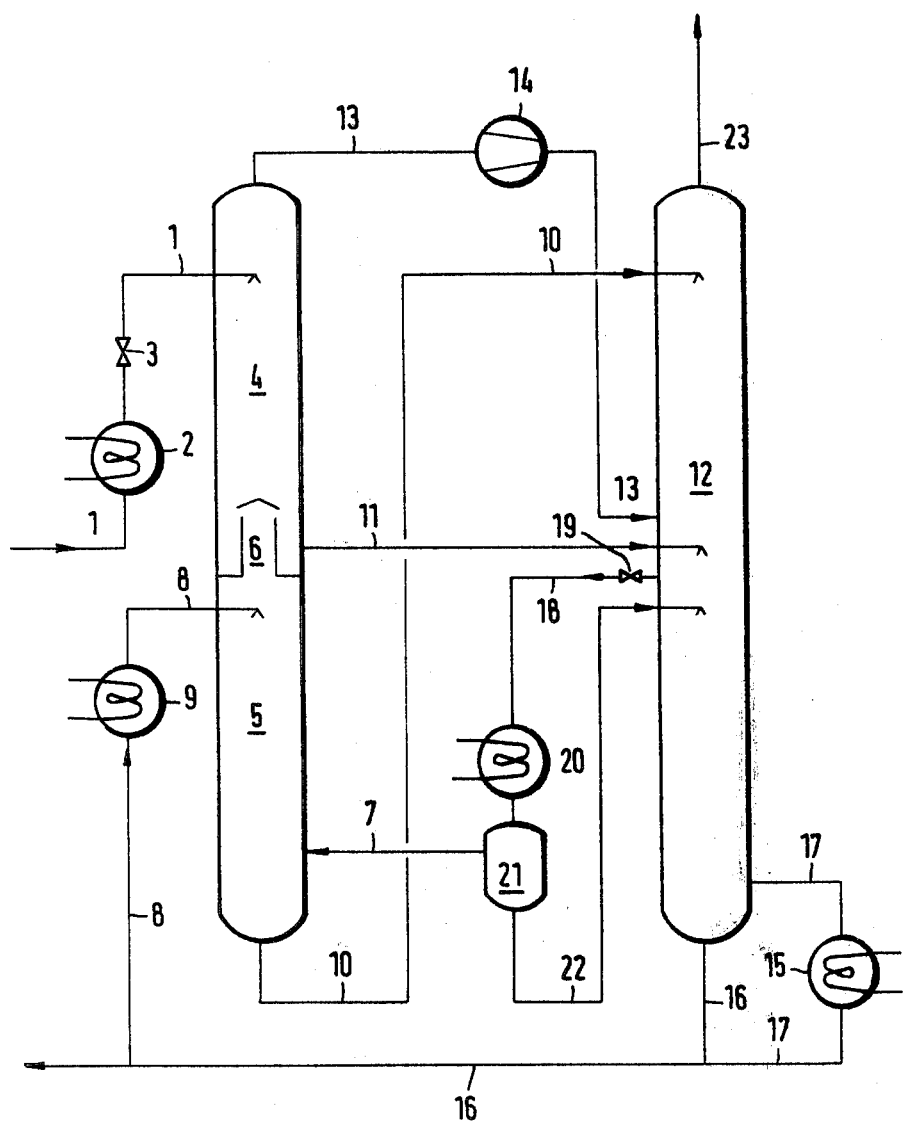
FIG. 2 is a flow diagram illustrating a preferred embodiment of the invention.

This Example is illustrated in FIG. 2, which represents a preferred embodiment of the invention. The solution to be regenerated is supplied through conduit 1 under a pressure of 20 bars and a temperature of 140° C. and per liter contains 205.4 grams potassium hydrogen carbonate, 5.7 grams potassium hydrogen sulfide, 60.0 grams borax and 93.6 grams potassium carbonate. The solution is cooled to 92° C. in the indirect cooler 2 and is pressure-relieved in the valve 3. Virtually no $CO_2$ and no $H_2S$ are released by the pressure relief. After the pressure relief the solution enters the $CO_2$ saturator 4, which is under a pressure of 1.2 bars and in which the solution at 85° C. absorbs $CO_2$ from the gas which rises through the gas transfer pipe 6, and consists predominantly of $CO_2$. As a result, the $KHCO_3$ content increases to 235.8 grams/liter and the $K_2CO_3$ content is decreased. 62% of the total alkali are now present as $KHCO_3$. The remaining gases are conducted through a conduit 13 and a compressor 14 into the upper portion of a regenerator 12 which is under a pressure of 1.5 bars. The solution to be regenerated, which is saturated with $CO_2$, flows through conduit 11 into the lower portion of the regenerator 12 and is stripped there at its boiling temperature by the gas which rises from the bottom and consists mainly of water vapor. That gas is produced in that the regenerated solution which runs off through conduit 16 is circulated in the conduit 17 and heated by an indirectly heated reheater 15.

Under the inlet 11 for the solution, part of the gas which rises in the lower portion of the regenerator and consists predominantly of water vapor is withdrawn through conduit 18, which incorporates a control valve 19, and the withdrawn gas is cooled in the indirect cooler 20. The resulting aqueous condensate is separated in a separator 21 and is recycled to the regenerator 12 through a conduit 22. The gas leaving the separator 21 consists mainly of $CO_2$ and also contains $H_2S$ and is conducted through conduit 7 to the $H_2S$ scrubber 5. A partial stream of the regenerated solution is fed through conduit 8 and the indirect cooler 9 to the scrubber 5, in which a major part of the $H_2S$ content of the gas is scrubbed off at 30° C. and under a pressure of 1.3 bars so that the gas entering the $CO_2$ saturator 4 through the gas transfer pipe 6 contains only 200 ppm $H_2S$. In the solution running off through the conduit 10 the $H_2S$ which has been removed is contained as KHS. That solution is fed to the top of the regenerator 12, in which the $H_2S$ is driven off and exits together with $CO_2$ through conduit 23.

In addition to borax, the regenerated solution running off through conduit 16 contains only 0.58 grams KHS/liter and 68.5 grams $KHCO_3$/liter but 193.0 grams $K_2CO_3$/liter. It is apparant that relative to the composition of the solution in conduit 1, 90% of the KHS content have been decomposed and driven off as $H_2S$ but only 67% of the $KHCO_3$ content. The solution which has been selectively regenerated according to the invention can be used at 140° C. in an absorber under a pressure of 20 bars to desulfurize a gas containing 0.3% $H_2S$ by volume to a residual content of 200 ppm, which means that more than 93% of the $H_2S$ content have been scrubbed off, whereas only 20 to 30% of the $CO_2$ also contained in the gas are also scrubbed off.

EXAMPLE 3

Figure 3:
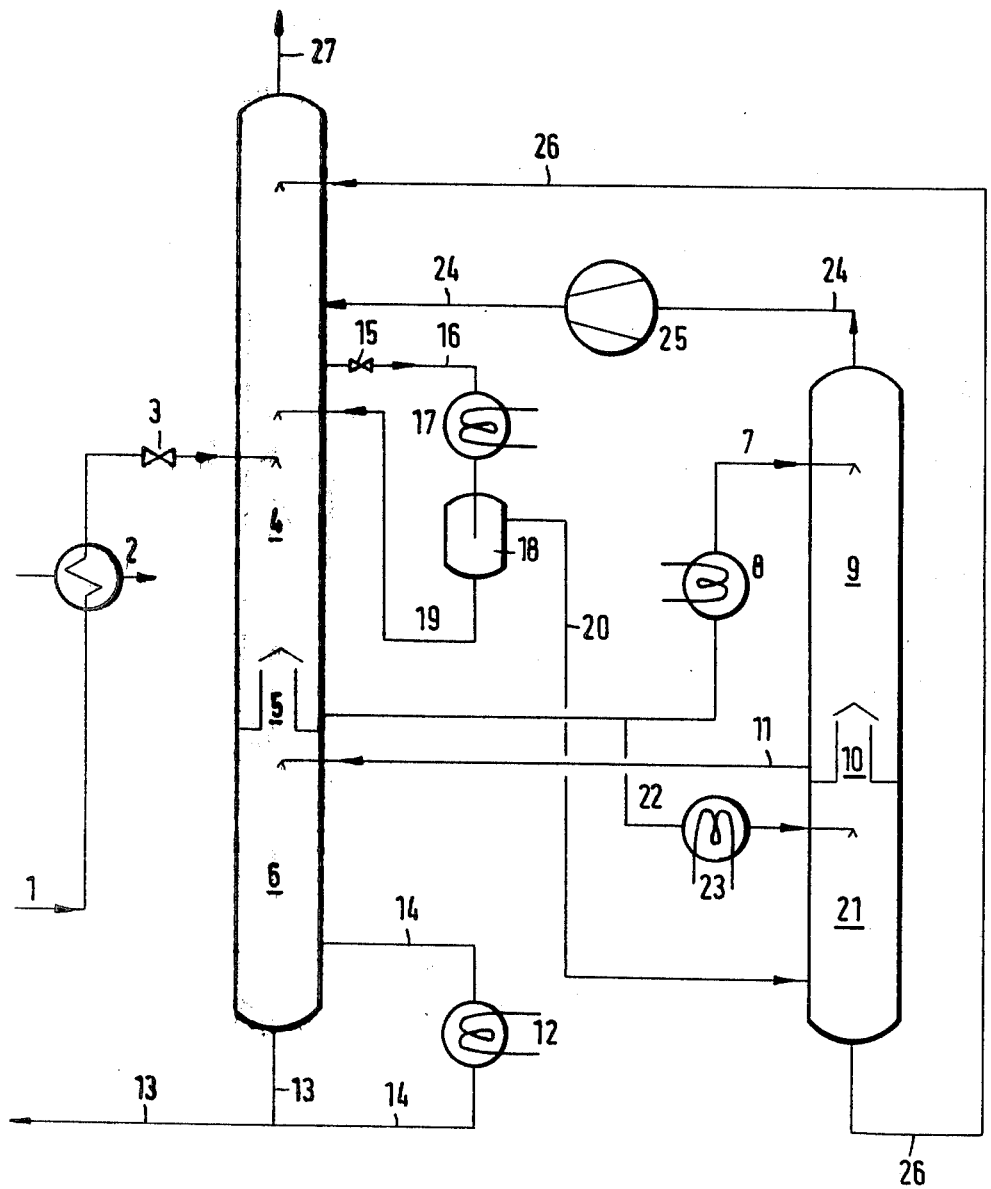
FIG. 3 is a flow diagram illustrating a further preferred embodiment of the invention.

Another preferred embodiment of the invention is diagrammatically shown in FIG. 3. A solution which contains 235.8 grams $KHCO_3$/liter (=62% of the total alkali content), 21.6 grams KHS/liter, 75 grams borax/liter and 51.9 grams $K_2CO_3$/liter is supplied at a temperature of 120° C. and under a pressure of 21 bars through conduit 1. The solution is cooled to 91° C. in the indirect cooler 2, and pressure-relieved in valve 3 to the pressure of 1.6 bars which prevails in the stripper 4, to which the pressure-relieved solution is supplied. A gas consisting predominantly of water vapor is conducted from the stripper 6 and enters the stripper 4 through the gas transfer pipe 5. The solution is stripped at its boiling temperature and after being stripped contains 83.7 grams $KHCO_3$/liter, 4.8 grams KHS/liter, 75.0 grams borax/liter, and 173.1 grams $K_2CO_3$/liter. The solution then flows through conduit 7 into the indirect cooler 8 and is cooled therein to 85° C. and subsequently enters the $CO_2$ saturator 9, which is under a pressure of 1.4 bars. A gas consisting predominantly of $CO_2$ enters the $CO_2$ saturator through a gas transfer pipe 10 and is used to treat the solution at 80° to 90° C. The treated solution contains 247.2 grams $KHCO_3$/liter, 4.4 grams KHS/liter, 75.0 grams borax/liter and 60.6 grams $K_2CO_3$/liter and is fed in conduit 11 to the second stripper 6. In the latter the solution is regenerated at its boiling temperature under a pressure of 1.6 to 1.7 bars by being stripped with a gas which consists mainly of water vapor and is formed in that the solution circulated in conduits 13 and 14 is indirectly heated in the reheater 12. The regenerated solution running off through conduit 13 contains only 0.7 grams KHS/liter as well as 87.5 grams KHCO$_3$/liter, 74.8 grams borax/liter and 174.4 grams K$_2$CO$_3$/liter. It is apparent that a total of 96.8% of the hydrosulfide KHS and 62.9% of the bicarbonate KHCO$_3$ fed through conduit 1 have been decomposed and driven off and that the regeneration has been highly selective for KHS. The regenerated solution can be used to desulfurize gases and need not be cooled before.

A partial stream of the gases rising in the stripper 4 is withdrawn through conduit 16, which incorporates a control valve 15, and is cooled to 25° C. in the cooler 17. The resulting aqueous condensate is withdrawn from the separator 18 and is recycled through conduit 19 to the stripper 4. The cooled gas is fed through the conduit 20 to the H$_2$S scrubber 21 and is scrubbed there under a pressure of 1.4 to 1.5 bars with a partial stream of the alkali carbonate solution. That partial stream is provided in that part of the solution in conduit 7 is branched off through conduit 22 and cooled in the indirect cooler to 23° to 26° C. In the scrubber 21, the H$_2$S is removed from the gas at 26° to 30° C. to a residual content of 280 ppm. The scrubbed gas, which consists predominantly of CO$_2$, serves to treat the solution in the CO$_2$ saturator 9. The non-absorbed gas is withdrawn through conduit 24 and is fed by a compressor 25 into the stripper 4.

The high-H$_2$S solution running off from the scrubber 21 is fed through conduit 26 to the top of the stripper 4 for driving off the H$_2$S. The exhaust gas contains water vapor and is withdrawn through conduit 27. It contains all hydrogen sulfide that has been driven off in the regenerating stage and also the CO$_2$ which has been driven off.

In the manner which has been described, the solution can be regenerated so that a regenerated solution can be obtained which can be used to desulfurize to a residual content of 200 to 300 ppm H$_2$S a gas which contains 1.0% H$_2$S by volume and 10.2% CO$_2$ by volume at 120° C. under a pressure of 21 bars, which means that 97% of the H$_2$S are scrubbed off. Only 25% of the CO$_2$ are scrubbed off at the same time.

We claim:

1. In a process for selective removal of H$_2$S from hot gases containing H$_2$S and CO$_2$, wherein the gases are contacted at superatmospheric pressure with an alkali metal carbonate solution and the resultant alkali metal carbonate solution which contains hydro-sulfides and bicarbonates is regenerated by pressure relieving the same, the so pressure relieved solution is thereafter stripped and re-used for selective removal of H$_2$S from hot gases containing the same and carbon dioxide, the improvement which comprises adjusting the alkali metal bicarbonate content of the pressure-relieved solution to be stripped so that it is at least 55% of the total alkali content of the solution and reusing said solution, following stripping, without cooling the same.

2. A process according to claim 1, characterized in that a decrease of the alkali bicarbonate content of the laden solution before the stripping thereof is avoided in that the solution before being pressure-relieved is cooled below its boiling temperature at the pressure relief end pressure preferably to 80°–95° C.

3. A process according to claim 2, characterized in that the cooled solution is treated under normal or superatmospheric pressure at 50° to 100° C. with a gas which consists predominantly of CO$_2$ and the CO$_2$-saturated solution is then stripped at its boiling temperature with a gas which consists predominantly of water vapor.

4. A process according to claim 3, characterized in that the stripped solution is cooled once more and is stripped at 50° to 100° C. with a gas which consists predominantly of CO$_2$ and the solution is subsequently stripped with a gas which consists predominantly of water vapor.

5. A process according to claim 4, characterized in that the multi-stage treatment of the solution is repeated several times.

6. A process according to claim 1, characterized in that the solution to be regenerated is stripped at its boiling temperature with a gas which consists predominantly of water vapor and has been obtained by an indirect heating of the stripped solution.

7. A process according to claim 1, characterized in that the exhaust gas formed by the stripping is cooled, the condensate is separated, the cooled gas is scrubbed with a partial stream of the alkali carbonate solution at a temperature below 60° C., preferably 25° to 35° C., and all or part of the scrubbed gas consisting predominantly of CO$_2$ is used to saturate the cooled solution which is to be regenerated.

8. A process according to claim 2, characterized in that all or part of the scrubbed gas which consists predominantly of CO$_2$ is first used to saturate the cooled solution to be regenerated and is subsequently used to strip the heated partial stream of the alkali carbonate solution formed by the scrubbing of the cooled exhaust gas formed by the stripping step and is then discharged and the stripped partial stream is returned to the main cycle of the alkali carbonate solution.

9. A process according to claim 4, characterized in that a partial stream of the alkali carbonate solution is withdrawn from the scrubber for scrubbing the cooled exhaust gas formed by the stripping step and said partial stream is stripped at its boiling temperature with a gas consisting predominantly of water vapor to remove a predominant portion of hydrogen sulfide from said partial stream, the resulting gas, which contains hydrogen sulfide, is removed and the stripped partial stream is returned to the main cycle of the alkali carbonate solution.

10. A process according to claim 1, characterized in that the gas consisting predominantly of CO$_2$ is formed by the regeneration of a second cycle of alkali carbonate solution used to scrub the desulfurized, CO$_2$-containing hot gas under superatmospheric pressure.

11. A process according to claim 2, characterized in that the alkali carbonate solution contains sodium tetraborate in an amount of 1 to 20 mole percent of its total alkali content.

12. A process according to claim 1 characterized in that the desulfurized hot gas under superatmospheric pressure is used for an ecologically satisfactory production of electric power in a combined power plant process in which energy is recovered from the gas by a pressure relief and/or combustion of the gas and is utilized to drive gas turbines and/or to produce steam.

* * * * *

UNITED STATES PATENT AND TRADEMARK OFFICE
CERTIFICATE OF CORRECTION

PATENT NO. : 4,258,019
DATED : Mar. 24, 1981
INVENTOR(S) : Heinz Hiller et al

It is certified that error appears in the above-identified patent and that said Letters Patent are hereby corrected as shown below:

Col. 8, line 21  Delete "1" and insert --3--.

Col. 8, line 29  Delete "2" and insert --3--.

Col. 8, line 38  Delete "4" and insert --7--.

Col. 8, line 49  Delete "1" and insert --3--.

Signed and Sealed this

Sixth Day of October 1981

[SEAL]

Attest:

GERALD J. MOSSINGHOFF

Attesting Officer

Commissioner of Patents and Trademarks